(12) United States Patent
Pan et al.

(10) Patent No.: US 10,875,189 B2
(45) Date of Patent: Dec. 29, 2020

(54) SYSTEM AND METHOD FOR MANIPULATING DEFORMABLE OBJECTS

(71) Applicant: City University of Hong Kong, Kowloon (HK)

(72) Inventors: Jia Pan, Kowloon (HK); Zhe Hu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 338 days.

(21) Appl. No.: 15/889,490

(22) Filed: Feb. 6, 2018

(65) Prior Publication Data

US 2019/0240843 A1 Aug. 8, 2019

(51) Int. Cl.
*B25J 13/08* (2006.01)
*B25J 9/16* (2006.01)
*B25J 11/00* (2006.01)
*B25J 15/00* (2006.01)
*B25J 9/00* (2006.01)

(52) U.S. Cl.
CPC .......... *B25J 13/087* (2013.01); *B25J 9/0087* (2013.01); *B25J 9/1612* (2013.01); *B25J 9/1653* (2013.01); *B25J 9/1669* (2013.01); *B25J 9/1697* (2013.01); *B25J 11/005* (2013.01); *B25J 15/0033* (2013.01); *Y10S 901/09* (2013.01); *Y10S 901/31* (2013.01); *Y10S 901/47* (2013.01)

(58) Field of Classification Search
CPC ...... B25J 13/087; B25J 9/0087; B25J 9/1697; B25J 15/0033; B25J 11/005; B25J 9/1669; B25J 9/1653; B25J 9/1612; Y10S 901/31; Y10S 901/09; Y10S 901/47
See application file for complete search history.

(56) References Cited

U.S. PATENT DOCUMENTS

| 7,313,464 B1 * | 12/2007 | Perreault ................ B25J 9/1666 |
| | | 318/568.1 |
| 2016/0107316 A1 * | 4/2016 | Alt ........................ B25J 9/1697 |
| | | 700/259 |

FOREIGN PATENT DOCUMENTS

DE 4102840 10/1992

OTHER PUBLICATIONS

Tracking elastic deformable objects with an RGB-D sensor for a pizza chef robot Antoine Petit , Vincenzo Lippiello, Giuseppe Andrea Fontanelli, Bruno Siciliano Robotics and Autonomous Systems; vol. 88, Feb. 2017, pp. 187-201; (Year: 2017).*

Online Learning of Part Deformation Models in Robotic Cleaning of Compliant Objects Joshua D. Langsfeld, Ariyan M. Kabir, Krishnanand N. Kaipa; Satyandra K. Gupta ; Proceedings of the ASME 2016 International Manufacturing Science and Engineering Conference (Year: 2016).*

(Continued)

*Primary Examiner* — Bhavesh V Amin
(74) *Attorney, Agent, or Firm* — Renner Kenner Greive Bobak Taylor & Weber

(57) ABSTRACT

A method for manipulating a deformable object includes determining respective 3D position of one or more markers on the deformable object held by a robotic manipulator; determining a deformation model of the deformable object by mapping movement of the robotic manipulator and movement of one or more markers; and controlling the robotic manipulator based on the determined deformation model to manipulate the deformable object so as to move the one or more markers into respective target position.

27 Claims, 14 Drawing Sheets

(56) References Cited

OTHER PUBLICATIONS

Reliable automatic calibration of a marker-based position tracking system David Claus and Andrew W. Fitzgibbon;Proceedings of the Seventh IEEE Workshop on Applications of Computer Vision (WACV/MOTION'05) (Year: 2005).*

Indirect simultaneous positioning of deformable objects with multi-pinching fingers based on an uncertain model S. Hirai and T. Wada; Published online by Cambridge University Press: Jan. 1, 2000 (Year: 2000).*

Manipulation of Deformable Objects Without Modeling and Simulating Deformation Dmitry Berenson;2013 IEEE/RSJ International Conference on Intelligent Robots and Systems (IROS) (Year: 2013).*

Bi-Manual Robotic Paper Manipulation Based on Real-Time Marker Tracking and Physical Modelling Christof Elbrechter, Robert Haschke; 2011 IEEE/RSJ International Conference on Intelligent Robots and Systems (Year: 2011).*

Morphological Filtering for Image Enhancement and Detection Petros Maragos(1) and Lucio F. C. Pessoa (2); P. Maragos & L. Pessoa: Chapter for the Image and Video Processing Handbook, Acad. Press (Year: 1999).*

Robert Bridson, et al, "Robust treatment of collisions, contact and friction for cloth animation". ACM Transactions on Graphics, 21(3):594-603, 2002.

P.R. Brown, et al, "Large deflection bending of woven fabric for automated material handling". The Journal of the Textile Institute, 81:1-14, 1990.

Chao Cao, et al, "Analyzing the utility of a support pin in sequential robotic manipulation". In IEEE International Conference on Robotics and Automation, 2016, to appear.

Michel Carignan, et al, "Dressing animated synthetic actors with complex deformable clothes". ACM Computer Graphics.

Kwang-Jin Choi, et al, "Research problem in clothing simulation". Journal of Computer-Aided Design, 37:585-592, 2005.

Haili Chui, et al, "A new point matching algorithm for non-rigid registration". Computer Vision and Image Understanding, 89(2-3):114-141, 2003.

Fabian Hahn, et al, "Subspace clothing simulation using adaptive bases". ACM Transactions on Graphics, 33(4):105, 2014.

Sandy H. Huang, et al, "Leveraging appearance priors in non-rigid registration, with applications to manipulation of deformable objects". In International Conference on Intelligent Robots and Systems, 2015.

Jonathan M. Kaldor, et al, "Efficient yarn-based cloth with adaptive contact linearization". ACM Transactions on Graphics, 29(4):105, 2010.

Tsz-Ho Kwok, et al, "Styling evolution for tight-fitting garments". IEEE Transactions on Visualization and Computer Graphics, page to appear, 2015.

P. Moll. "Integrated 3d sewing technology and the importance of the physical and mechanical properties of fabric". International Journal of Clothing Science and Technology, 9(3), 1997.

Matthew Moore, et al, "Collision detection and response for computer animation". In ACM SIGGRAPH, pp. 289-298, 1988.

Jia Pan, et al, "Probabilistic collision detection between noisy point clouds using robust classification". In International Symposium on Robotics Research, 2011.

Jia Pan, et al, "Collision-free and smooth trajectory computation in cluttered environments". International Journal of Robotics Research, 31(10):1155-1175, 2012.

Jia Pan, et al, "Efficient penetration depth approximation using active learning". ACM Transactions on Graphics, 32(6):191:1-191:12, 2013.

Xavier Provot. "Collision and self-collision handling in cloth model dedicated to design garments". In Graphics Interface, pp. 177-189, 1997.

John Schulman, et al, "Motion planning with sequential convex optimization and convex collision checking". International Journal of Robotics Research, 33(9):1251-1270, 2014.

Jie Tan, et al, "Animating human dressing". ACM Transactions on Graphics, 34(4):116:1-8, 2015.

Matthias Teschner, et al, "A versatile and robust model for geometrically complex deformable solids". In Computer Graphics International, pp. 312-319, 2004.

Huamin Wang. "Defending continuous collision detection against errors". ACM Transactions on Graphics, 33(4):122:1-8, 2014.

Jerry Weil. "The synthesis of cloth objects". 20(4):49-54, 1986.

* cited by examiner

SYSTEM AND METHOD FOR MANIPULATING DEFORMABLE OBJECTS

TECHNICAL FIELD

The invention relates to system and method for manipulating deformable objects, and particularly, although not exclusively, to system and method for manipulating fabrics.

BACKGROUND

Robots are widely used in the manufacturing industry to free human workers from tedious repetitive tasks. Techniques for rigid body manipulation have been developed and applied in industry for decades. However, to date, there are few deformable object manipulation methods that are mature enough for practical applications.

Compared to the rigid object manipulation, tasks related to deformable object manipulation have many additional challenges. One example of deformable object manipulation is the assembly of cloth pieces to fixtures. In this task, a piece of cloth with holes has to be aligned with a fixture made by a set of vertical locating pins. The assembled cloth pieces are then sent to the sewing machine for sewing operations. The task can be efficiently performed by a human worker without any training, but may be difficult for a robot. For instance, the wrinkles generated during operation will interfere with feature extraction and tracking procedures that are critical for perception feedbacks. Also, the highly deformable property of the cloth will lead to unpredictable changes in the size and shape of the holes during the manipulation. These challenges make it difficult to achieve an accurate and reliable robotic manipulation control for clothes.

SUMMARY OF THE INVENTION

It is an object of the invention to address the above needs, to overcome or substantially ameliorate the above disadvantages or, more generally, to provide an improved system and method for manipulating deformable objects.

In accordance with a first aspect of the invention, there is provided a method for manipulating a deformable object, comprising: determining respective 3D position of one or more markers on the deformable object held by a robotic manipulator; determining a deformation model of the deformable object by mapping movement of the robotic manipulator and movement of one or more markers; and controlling the robotic manipulator based on the determined deformation model to manipulate the deformable object so as to move the one or more markers into respective target position.

In one embodiment of the first aspect, the determination of respective 3D position of one or more markers comprises: detecting the one or more markers on the deformable object; tracking the one or more markers on the deformable object as the deformable object is manipulated by the robotic manipulator; and calculating respective 3D position of the one or more markers based on the detection and tracking result.

In one embodiment of the first aspect, the detection of the one or more markers comprises: detecting, using a sensor, respective 2D position of the one or more markers. Preferably, the detection uses a template matching method that includes: comparing data obtained by the sensor with reference data for the one or more markers to determine similarity; and determining the presence of the one or more markers based on similarity result. The template matching method may further include: binarizing the similarity result based on a threshold and applying a morphological operation to the binarized result to facilitate determination of the presence of the one or more markers.

In one embodiment of the first aspect, the tracking of the one or more markers comprises: detecting, using a sensor, respective 2D position of the one or more markers as the deformable object is manipulated. Preferably, the tracking uses a kernelized correlation filters tracking method that includes: comparing data obtained by the sensor at different instances using a classifier. The classifier can be trained using data obtained by the sensor at different instances.

In one embodiment of the first aspect, the deformation model is determined based on online learning.

In one embodiment of the first aspect, the mapping is based on a Gaussian mapping function.

In one embodiment of the first aspect, the deformation model is continuously determined as the robotic manipulated is controlled based on the determined deformation model.

In one embodiment of the first aspect, controlling the robotic manipulator to manipulate the deformable object includes: moving the deformable object to align the one or more markers with the respective target position; and moving the deformable object to bring the one or more markers to the respective target position. In one example, moving the deformable object to bring the one or more markers to the respective target position comprises moving the deformable object along a single direction, for example a vertical direction.

In one embodiment of the first aspect, the sensor comprises one or more depth cameras. The depth cameras may be one or more of ranging camera, flash LIDAR, time-of-flight camera, RGBD camera, etc. Preferably, the sensor comprises an RGBD camera.

In one embodiment of the first aspect, the robotic manipulator comprises at least two robotic arms each having an end-effector for holding the deformable object. Preferably, the end-effector includes one or more gripping plates, each of which includes a gripping surface with one or more nubs.

In one embodiment of the first aspect, the deformable object is a piece of fabric, for example, cloth. The one or more markers may be holes in the deformable object. The holes may be of different shape, e.g., circular, squared, oval, oblong, etc.

In accordance with a second aspect of the invention, there is provided a system for manipulating a deformable object, comprising a controller arranged to: determine respective 3D position of one or more markers on the deformable object held by a robotic manipulator; determine a deformation model of the deformable object by mapping movement of the robotic manipulator and movement of one or more markers; and control the robotic manipulator based on the determined deformation model to manipulate the deformable object so as to move the one or more markers into respective target position.

In one embodiment of the second aspect, the system further comprises a sensor, operably connected with the controller, for detecting and tracking the one or more markers on the deformable object.

In one embodiment of the second aspect, the sensor comprises one or more depth cameras. The depth cameras may be one or more of ranging camera, flash LIDAR, time-of-flight camera, RGBD camera, etc. Preferably, the sensor comprises an RGBD camera.

In one embodiment of the second aspect, the system further comprises the robotic manipulator operably connected with the controller. Preferably, the robotic manipulator comprises at least two robotic arms each having an end-effector for holding the deformable object. The end-effector may include one or more gripping plates each having a gripping surface with one or more nubs.

In one embodiment of the second aspect, the controller is arranged to process data obtained by the sensor, to calculate respective 3D position of the one or more markers.

In one embodiment of the second aspect, the controller is arranged to: compare data obtained by the sensor with reference data for the one or more markers to determine similarity; binarizing the similarity result based on a threshold and applying a morphological operation to the binarized result; and accordingly, determine the presence of the one or more markers.

In one embodiment of the second aspect, the controller is arranged to: compare data obtained by the sensor at different instances using a classifier, wherein the classifier is trained using data obtained by the sensor at different instances.

In one embodiment of the second aspect, the deformation model is determined based on online learning and the mapping is based on a Gaussian mapping function.

In accordance with a third aspect of the invention, there is provided a non-transitory computer readable medium for storing computer instructions that, when executed by one or more processors, causes the one or more processors to perform a method for manipulating a deformable object, comprising: determining respective 3D position of one or more markers on the deformable object held by a robotic manipulator; determining a deformation model of the deformable object by mapping movement of the robotic manipulator and movement of one or more markers; and controlling the robotic manipulator based on the determined deformation model to manipulate the deformable object so as to move the one or more markers into respective target position.

BRIEF DESCRIPTION OF THE DRAWINGS

Embodiments of the invention will now be described, by way of example, with reference to the accompanying drawings in which:

FIG. 3A represents squared difference; FIG. 3B represents normalized squared difference; FIG. 3C represents cross correlation; FIG. 3D represents normalized cross correlation; FIG. 3E represents correlation coefficient; and FIG. 3F shows normalized correlation coefficient;

FIG. 5A shows the original depth image when self-occlusion happens; and FIG. 5B shows the detection of holes from the noisy data, as shown by the red contours, using the method in one embodiment of the invention;

DETAILED DESCRIPTION OF THE PREFERRED EMBODIMENT

Figure 6:
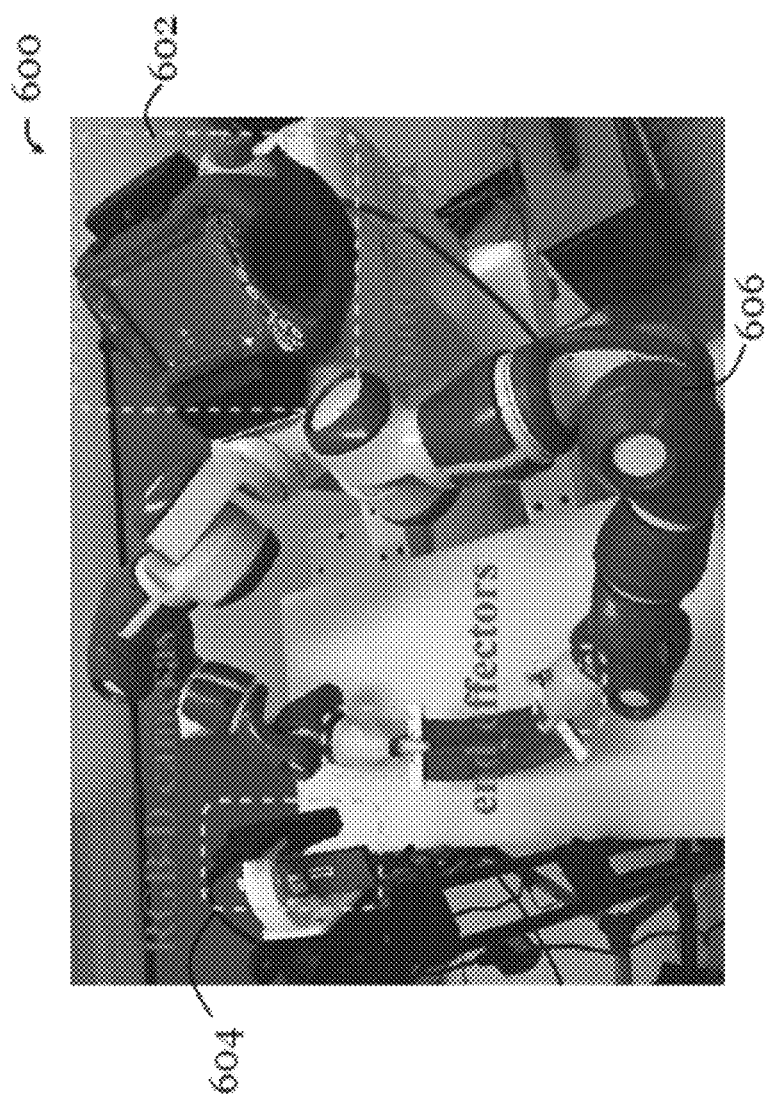
FIG. 6 is a picture showing the set-up of a system for manipulating a deformable object in one embodiment of the invention.

FIG. 6 shows a system 600 for manipulating a deformable object in one embodiment of the invention. The system 600 includes a controller 602 arranged to: determine respective 3D position of one or more markers on the deformable object held by a robotic manipulator 606; determine a deformation model of the deformable object by mapping movement of the robotic manipulator and movement of one or more markers; and control the robotic manipulator based on the determined deformation model to manipulate the deformable object so as to move the one or more markers into respective target position. In one example the deformable object may be a piece of cloth, and the markers may be one or more holes in the cloth.

The system 600 also includes a sensor 604, operably connected with the controller, for detecting and tracking the one or more markers on the deformable object. The sensor 604 includes one or more depth cameras, which is preferably RGBD camera but can also be may be ranging camera, flash LIDAR, time-of-flight camera, etc.

Figure 7:
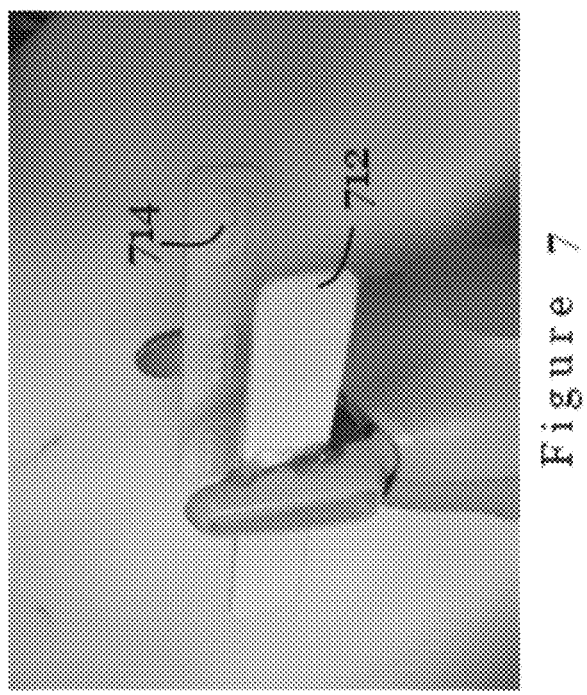
FIG. 7 is a picture showing an assistive component attached to the end-effector of the robotic manipulator for reducing the amount and size of wrinkles and folds during the manipulation process in one embodiment of the invention.

The robotic manipulator 606 is operably connected with the controller 602. The robotic manipulator 606 can have 6 degrees of freedom, and it includes at least two robotic arms each having an end-effector for holding the deformable object. The end-effector may include one or more gripping plates 712 each having a gripping surface with one or more nubs 714, as shown in FIG. 7.

In one embodiment, the controller 602 is arranged to process data obtained by the sensor, to calculate respective 3D position of the one or more markers. The controller 602 is further arranged to: compare data obtained by the sensor 604 with reference data for the one or more markers to determine similarity; binarizing the similarity result based on a threshold and applying a morphological operation to the binarized result; and accordingly, determine the presence of the one or more markers. The controller 602 may compare data obtained by the sensor 604 at different instances using a classifier, wherein the classifier is trained using data obtained by the sensor at different instances. In a preferred embodiment, the deformation model is determined based on online learning and the mapping is based on a Gaussian mapping function.

In one embodiment of the invention, the system 600 can be applied to a cloth assembly task, and in particular, a manipulation procedure where the robotic end-effectors manipulate the cloth pieces in a way such that the holes in the cloth pieces will be aligned with the set of pins on a fixture and eventually the pins will go through the holes to accomplish the assembly. This task can be divided into two subtasks: to retrieve the 3D position of each hole, and to control the robot arms to move the cloth pieces into the targeted position based on the positions of holes and pins.

In this manipulation task, a function $F(\bullet)$ is used to describe the relationship between the relative displacement of current positions of holes c and the velocity of the manipulated points x on the object which is grabbed by the end-effectors $$\delta x = F(\delta c). \quad (1)$$

Figure 1:
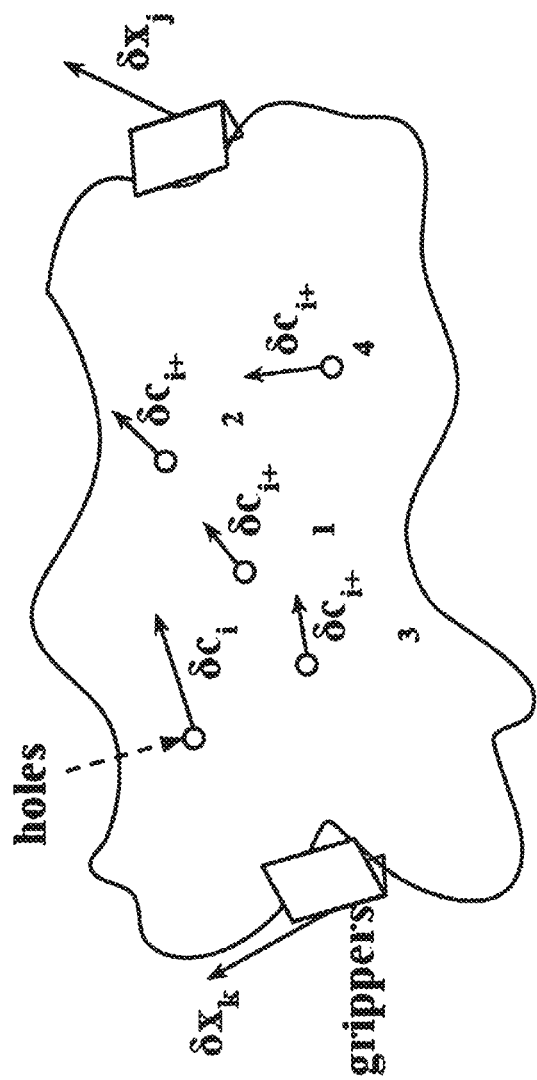
FIG. 1 is a schematic diagram illustrating the relationship between holes in the deformable object and movement of the robotic manipulator in accordance with one embodiment of the invention.

FIG. 1 illustrates the relationship between markers in the form of holes in the deformable object and movement of the robotic manipulator (grippers) in accordance with one embodiment of the invention. Given the target position of holes $c^d$ and current position of the holes $c_*$, the required manipulation velocity $\dot{x}$ for the end-effectors in each control cycle can be obtained using $$\dot{x} = F(\eta \cdot (c_d - c_*)), \quad (2)$$

where $\eta$ is an appropriate feedback gain to be tuned for fast convergence; $c^d$ and $c_*$ are the target and current positions of the holes in the 3D workspace, respectively. In the present embodiment, the function $F(\bullet)$ will change according to the shape and material of the cloth piece as well as the patterns of holes in the cloth piece.

The system 600 is adapted for the general deformable object control. The robotic manipulator 606 may have a sufficient number of degrees of freedom for dexterous manipulation of cloth pieces. The robotic manipulator 606 supports velocity control, i.e., controlled by the controller 602, to implement the feedback control policy in Equation 2. At least one sensor, preferably RGBD sensor 604, is arranged in the system 600 to provide 3D measurements for the deformable object.

The assembly task can be divided into two sub-tasks, and the system 600 of the present embodiment serves two major functions: perception and control. Perception relates to the detection and tracking of the holes in the cloth piece, and computation of the 3D position of each hole. Control refers to the generation of appropriate commands to drive the robotic arm based on the current positions of holes and pins.

Figure 2:
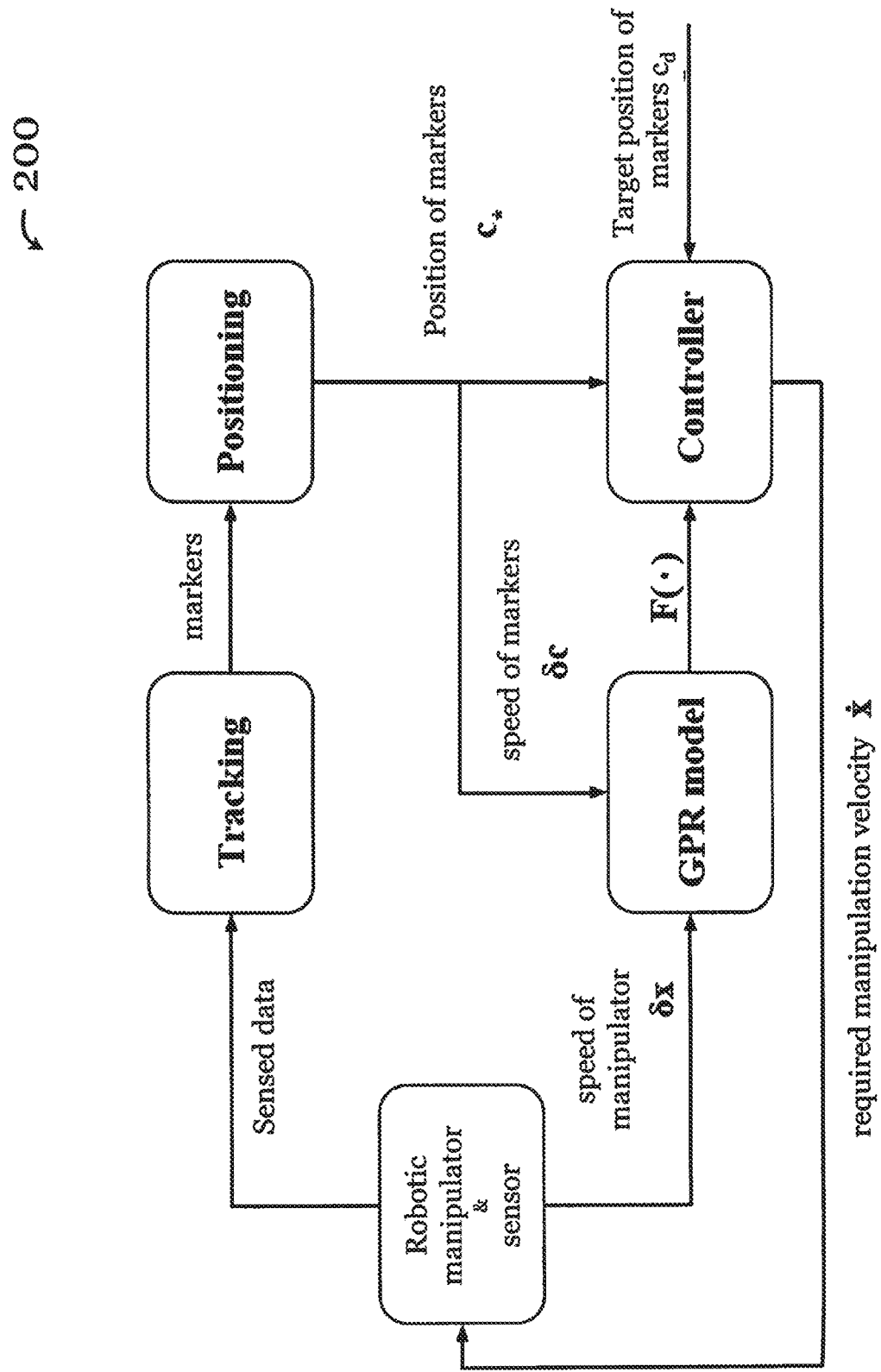
FIG. 2 is a flow diagram illustrating a method for manipulating a deformable object in one embodiment of the invention.

FIG. 2 illustrates a method 200 for manipulating a deformable object in one embodiment of the invention. The method generally involves, determining respective 3D position of one or more markers on the deformable object held by a robotic manipulator; determining a deformation model of the deformable object by mapping movement of the robotic manipulator and movement of one or more markers; and controlling the robotic manipulator based on the determined deformation model to manipulate the deformable object so as to move the one or more markers into respective target position. Determination of respective 3D position of one or more markers comprises: detecting the one or more markers on the deformable object; tracking the one or more markers on the deformable object as the deformable object is manipulated by the robotic manipulator; and calculating respective 3D position of the one or more markers based on the detection and tracking result. Detail of the method 200 is provided in more detail below.

Perception

The perception sub-task includes two steps: recognizing and tracking holes using the RGB-D data stream, and calculating the positions of holes based on the depth information.

In this embodiment, for performing recognition, a template matching method to determine the 2D positions of holes in the first frame. In particular, the difference between a template patch about the hole and all possible regions in the given image is first computed to find a set of candidate regions that have the highest similarity with the template. The regions with local maximum similarity as the hole positions are then selected.

To improve the hole recognition performance, in this embodiment, the matching similarity result is first binarized using a fixed threshold and then morphological operations including dilation and erosion are applied to the binarized result to further separate potential connected regions. In this way, the point with local maximum similarity inside each region can represent a valid matching target for a hole.

Figure 3C:
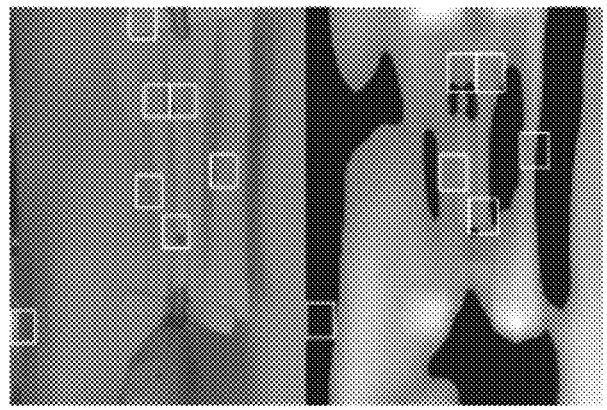
FIGS. 3A-3F illustrate different metrics used in template matching in the method of FIG. 2, wherein the upper image shows the positions of candidates on the original RGB images and the lower image shows the positions of candidates on the response image where the intensity represents the response level, and each white box represents a valid matching candidate, in particular.
Figure 3B:
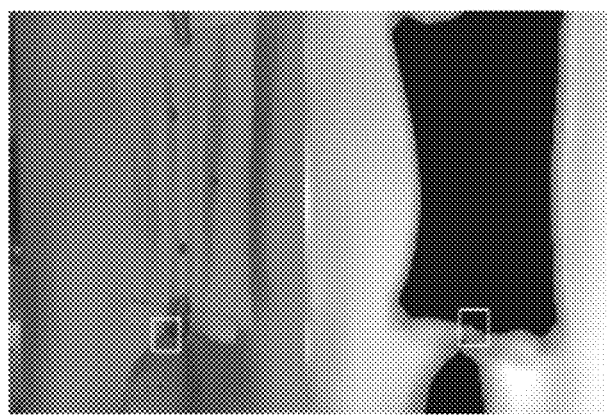
Figure 3A:
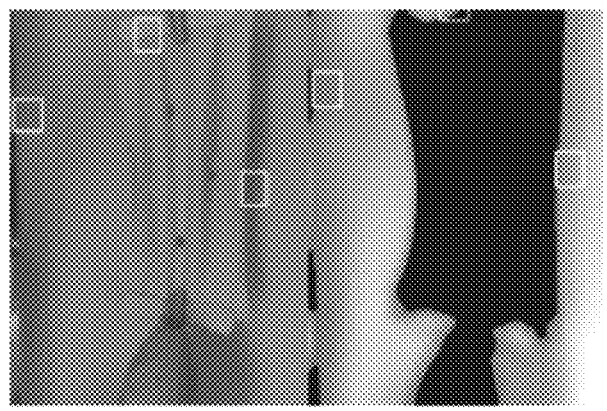
Figure 3F:
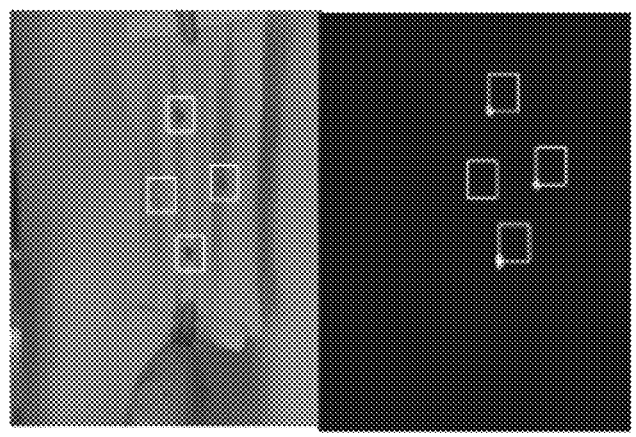
Figure 3E:
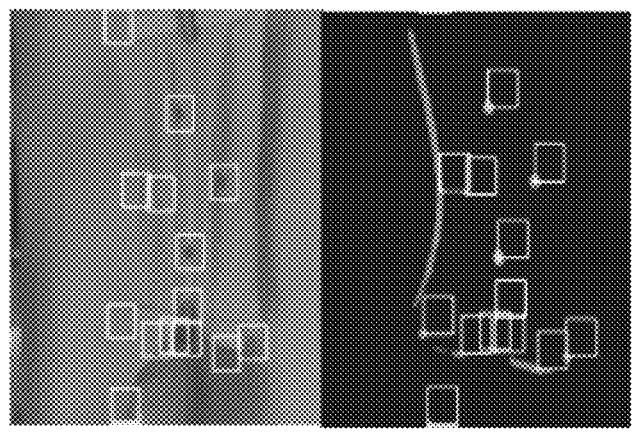
Figure 3D:
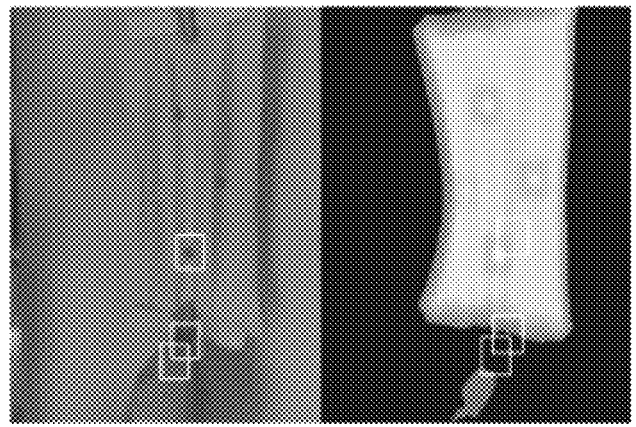

Various schemes can be used to calculate the similarity between two regions. FIG. 3A-3F show the comparison of different matching metrics, concluding squared difference (FIG. 3A), normalized squared difference (FIG. 3B), cross correlation (FIG. 3C), normalized cross correlation (FIG. 3D), correlation coefficient (FIG. 3E), and normalized correlation coefficient (FIG. 3F). In the present embodiment, the one can best tolerate the errors caused by the deformation and thus provide accurate matching results is chosen. According to the comparison results shown in FIG. 3A-3F, the normalized correlation coefficient metric for the template matching is chosen, which is computed as $$R(x, y) = \frac{\sum_{x',y'} (T(x', y') \cdot I(x+x', y+y'))}{\sqrt{\sum_{x',y'} T(x', y')^2 \cdot \sum_{x',y'} I(x+x', y+y')^2}}, \quad (3)$$

where R(x; y) is the similarity response at the location (x; y) in the current image I, and T is the template patch.

As the size and the shape of a hole may change during the manipulation, a robust and time-efficient tracker for the holes is necessary. In this embodiment, the Kernelized Correlation Filters (KCF) tracking algorithm provided in J. F. Henriques, R. Caseiro, P. Martins, and J. Batista, "*High-speed tracking with kernelized correlation filters*," *IEEE Transactions on Pattern Analysis and Machine Intelligence*, vol. 37, no. 3, pp. 583-596, 2015 is used because the KCF algorithm uses circulant matrices with Fourier transform to reduce the computational cost and leverages kernelized regression to guarantee the precision.

The KCF tracking algorithm trains a classifier using the patches extracted near the current positions of holes and uses the classifier to select the candidate hole regions with the highest response in the next frame. For each valid candidate, a square with constant size is generated to bound the hole. The regions inside squares are considered as the region of interest in the current frame for further processing and will be fed to the KCF tracker algorithm as new targets. In particular, the initial tracking targets are the valid matching regions from the template matching method.

Figure 4:
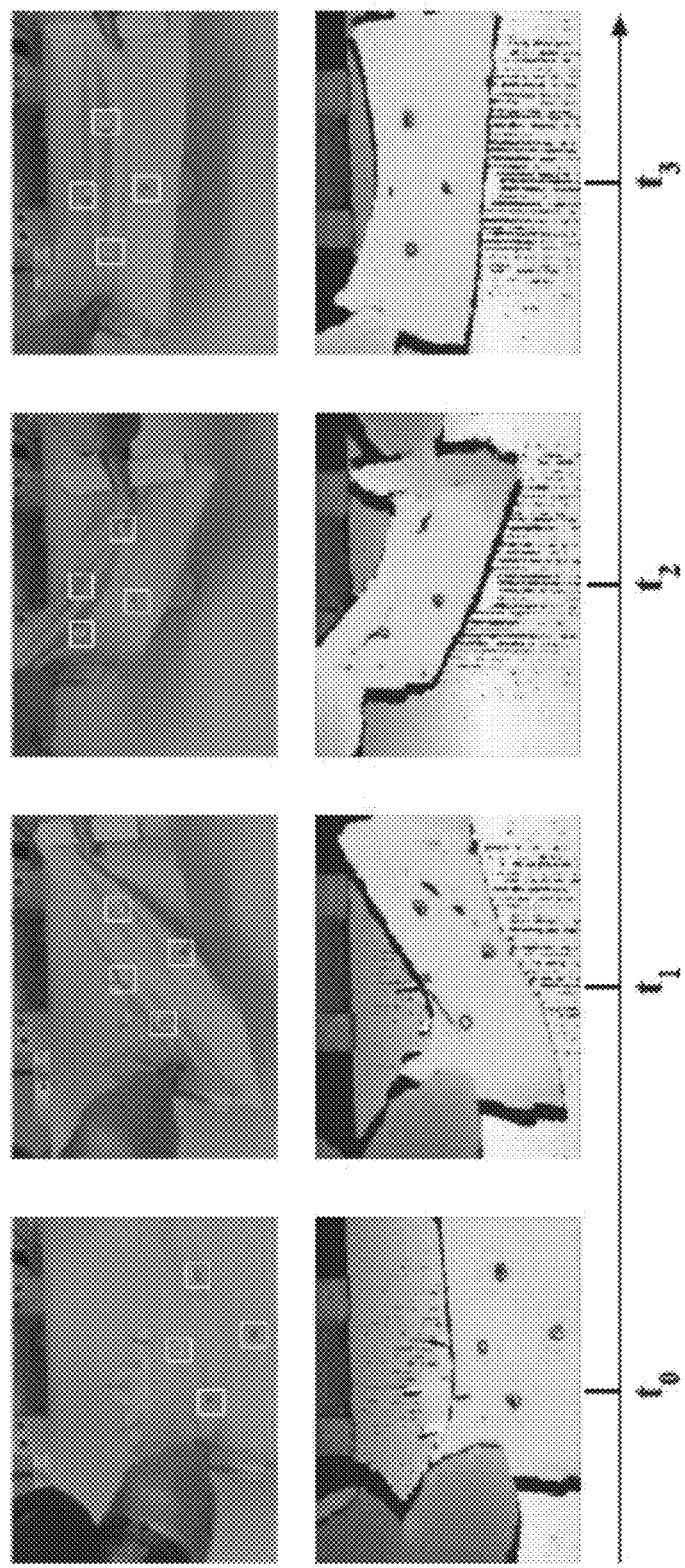
FIG. 4 illustrates the images (upper row) and the depth image (lower row) obtained using the tracking algorithm in one embodiment of the invention at different time points.

This tracking algorithm can monitor many holes simultaneously and keep stable tracking even when the shape of the cloth piece has been changed significantly during the manipulation, as demonstrated in FIG. 4.

To calculate the positions of holes, in the present embodiment, the geometric center of holes is used to describe the positions of holes in the cloth piece. Given $\{p_i\} \in \mathbb{R}^3$ for $1 \le i \le N$ which denote the position of points on the boundary of a hole, the geometric center C of the hole can be computed as $$C = (p_1 + p_2 + \ldots + p_N)/N \quad (4)$$

To accomplish the above measurement, 2D points on the hole boundary is first extracted from the RGB image. These 2D points correspond to the projection of the hole onto the image plane, and thus they should form a closed contour in 2D. The searching area for these contours shrinks from the whole image into the areas of interest provided by KCF tracking algorithm, because holes may only exist in these areas. In ideal cases without occlusion, wrinkles or illumination change, the steepest intensity change in the region of interest should be perpendicular to the hole boundary. Thus, after applying the Canny edge detector, there should be only one closed contour inside the region of interest, which corresponds to the hole boundary. Due to the one-to-one correspondence between the 2D and depth images, the depth values of the points on the hole boundary can be easily computed. After taking the intrinsic parameters of the camera into account, the 3D positions of the hole boundary points can be computed.

Due to calibration error of the RGBD camera and noises caused by light reflection, not all points on the contour can have a valid depth value. To address this issue, in the present embodiment, the contour is enlarged evenly around its 2D center until all its boundary pixels have valid depth values.

In particular, a pixel $u_i \in \mathbb{R}^2$ on the hole boundary will be transformed into the 2D position $$u'_i = \alpha \times u_i + (1-\alpha) \sum_i u_j, \quad (5)$$

where $\alpha$ is the parameter for the enlarging ratio.

Figure 5B:
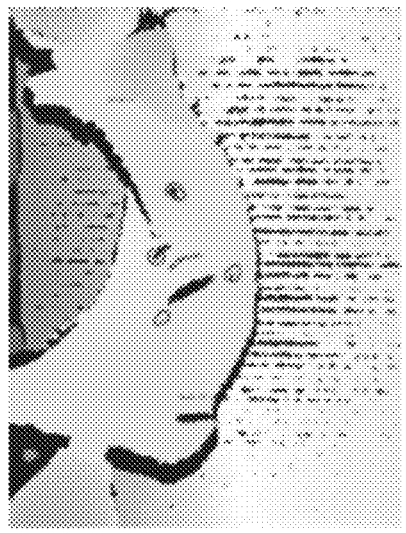
FIGS. 5A and 5B illustrate performance of our perception system, and in particular.
Figure 5A:
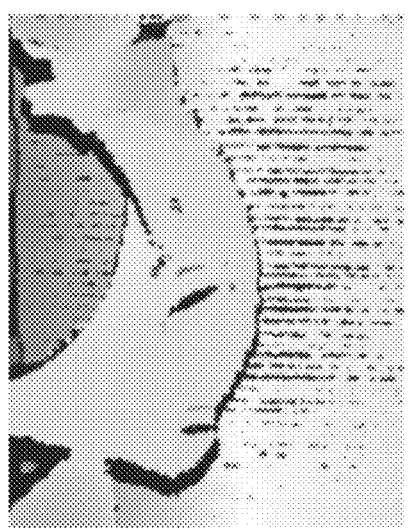

FIGS. 5A and 5B show that the system in the present embodiment can detect closed contours that provide a high-quality approximation to the holes' 3D positions, even when the depth image is noisy or has lost some information due to self-occlusion.

Control In our approach, the complete control pipeline can be divided into two stages: stage I—the robot moves the cloth piece to the pins; stage II—the robot controls the end-effectors to put down cloth pieces vertically.

In operation, the function between the relative displacement of the position of holes and the velocity of manipulated points depends on the cloth piece to be manipulated, because the function varies with the material, shape, or hole pattern of the cloth piece. In the present embodiment, stage I applies a general approach using an online learning algorithm to model this function adaptively during the manipulation process.

According to $\delta x = F(\delta c)$, the present embodiment requires a model to learn the mapping $F(\bullet)$ which predicts the required control velocity $\delta x$ given holes' velocity $\delta c$. Due to the highly nonlinear property of the function $F(\bullet)$, in the present embodiment, the mapping function F is formulated as a Gaussian process:

$$F \sim GP(0, k(\delta c, \delta c')), \quad (6)$$

where $$k(\delta c, \delta c') = \exp\left(\frac{-\|\delta c - \delta c'\|^2}{2\sigma_{RBF}^2}\right)$$

is the covariance function called radial basis function (RBF) and parameter σRBF sets the spread of the kernel. Accordingly, $$\begin{bmatrix} \delta X \\ x \end{bmatrix} \sim \mathcal{N}\left(0, \begin{bmatrix} K(\delta C, \delta C) + \sigma_n^2 I & K(\delta C, e) \\ K(e, \delta C) & K(e, e) \end{bmatrix}\right) \quad (7)$$

where $e = \eta \cdot (c^d - c_*)$ is the difference between target positions $c^d$ and the current positions of holes $c_*$; $\delta C = \{\delta c_t\}_{t=1}^N$ and $\delta X = \{\delta x_t\}_{t=1}^N$ are the stack of the hole displacements and end-effector velocities collected during the manipulation; and $\sigma_n$ is the noise of the data measurements.

The Gaussian process regression in the present example will experience two phases during the manipulation process: the initialization phase and the manipulation phase (or online learning phase).

During the initialization phase, the controller gathers batches of data ($\delta X$, $\delta C$) to fit the GP model, which is also the training process of the model. The GPR controller receives the velocity of holes and manipulator (gripper) as input; however, when the and manipulator is not moving, i.e., when the velocity of manipulated points is zero, the controller should not take this entry as a valid sample since it does not provide any information about the deformable model of the cloth piece. Thus, the controller will only keep the data pairs where the velocity of the manipulator is non-zero.

In the manipulation phase, the GPR will predict the required speed $\dot{x}$ of each gripper to drive the cloth piece toward the goal state, where $$\dot{x} = K^T(\delta C, \delta e) \cdot [K(\delta C, \delta C) + \sigma_n^2 I]^{-1} \cdot \delta X. \quad (8)$$

Once the GP-based movement command is executed, the cloth will move immediately and a new pair of data is generated where $\delta x_*$ is the speed of end-effectors and $\delta x_*$ is the new visual feedback obtained from the perception. That is, the number of data samples for GPR will keep increasing during the manipulation. These new data samples can update the GP model about the possibly changing deformation parameters of the object. Since the GP model is keep updating during manipulation, this phase can be regarded as the online learning phase of GPR.

As the storage and computation cost of the covariance matrix K in GP grows quadratically, a maximum size of the covariance matrices must be set to enable the controller to operate at a high frequency. Thus, an upper limit N is set to restrict total stored samples and thus the upper limit size of covariance matrices is $N^2$. If a new sample is obtained while there are already N samples, a replacement policy is adopted to maintain the total amount of samples unchanged. In particular, an earlier sample with the largest kernelized similarity with other samples will be replaced by the new sample. This strategy helps the model to keep data items that contribute to the model simulation, and exposes the GPR model to more deformation variations. In addition, the controller will always use the most recent data to determine the movement in the next step, and thus can safely adapt to the changing deformation model. The entire replacement procedure can be accomplished efficiently with $\mathcal{O}(N^2)$ complexity.

After stage I, the cloth piece has been placed in a suitable position where the holes are aligned above the corresponding pins. In stage II, the controller only needs to enable the end effectors to move along a single direction, the direction of the pins, with the same speed to avoid any possible undesirable deformations. In this way, the cloth piece will be readily fixed onto the fixture.

Experiments

A set of experiments were conducted to assess the system and method of the present embodiment. The experiment is performed using a system, illustrated in FIG. 6, built based on a Yumi 14400 dual-arm collaborative robot with two RGBD cameras (Intel Realsense SR300 and ZR300) mounted. In this set-up, the two cameras have different perception fields and resolutions and are used in different scenarios categorized by the size of the workspace and the cloth piece. OpenCV is used or image processing and hole tracking. The controller sends velocity control commands to the robot and recalculates necessary trajectory variation automatically based on perception feedbacks.

Two different types of cloth pieces were used in experiments, one made of stretchable material and the other made of unstretchable material. The diameter of each hole in a cloth piece is about 1 cm, and the diameters of pins are around 0.7 cm. The distances between two holes and the corresponding pins may not be equal, in order to fulfill certain garment design requirements which needs to stretch or loose the cloth piece. The error tolerance for the distance between the centroid position of the hole and the corresponding target point is 0.005 m.

Unlike other cloth manipulation tasks such as sewing or folding that can be done by laying the cloth piece flat on a surface, the assembly tasks in the present example includes stretching and shrinking operations which require the cloth piece to be lifted. Because the inner part of the cloth is floating, the cloth piece is likely to have undesired wrinkles and pleats during the manipulation, which may complicate the tracking process. To alleviate this issue, an assistive component as shown in FIG. 7 is attached to the end-effectors to reduce the amount and size of folds. AS shown in FIG. 7, the assistive component is a gripping plate 712, a gripping surface of which has multiple nubs 714.

For control, the maximum velocity of the end-effectors is set as 0.04 m/s and the control frequency as 30 Hz. The initialization of GPR model is accomplished by movements either using pre-programmed tracks or under human instructions for the purpose of gathering enough data to describe the deformation model. The kernel spread width RR F in the covariance computation is set as 0.6, the noise level is set as 0.001, and the maximum size limit of the observation matrix N is 300.

For simplicity, the processes of controlling the robot to grasp the cloth and keep the location of fixtures unchanged in the above experiments are omitted.

Two experiments were performed to test the performance of our cloth assembly system.

Figure 8:
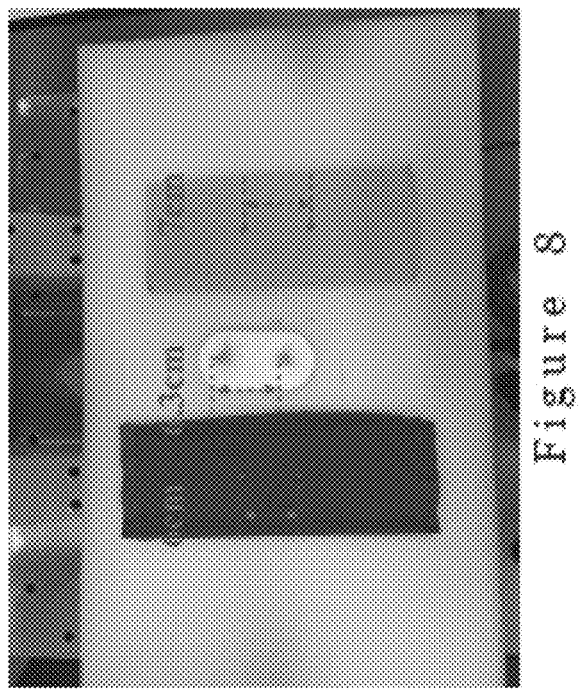
FIG. 8 is a picture showing items (from left to right: the stretchable cloth piece, the fixture, and the un-stretchable cloth piece) used in Experiment 1 performed using the system of FIG. 6.

Experiment 1 is designed to test the adaptability of the system of the present embodiment to materials with different deformation properties. In this experiment, a fixture and two different types of cloth pieces each with two holes as shown in FIG. 8 are used. The distance between centers of two holes in the stretchable cloth piece is 6 cm and the distance between centers of two holes in the unstretchable cloth piece is 7 cm (when the cloth is flattened on a smooth plane without subjecting to any external forces). The distance between pins of the fixture is 6.3 cm, in order to test the stability of this visual-servoing system under situations where extruding the stretchable material or shrinking the unstretchable material is demanded. The dimension of relative displacement vector is 6 for both the positions c of two holes and the positions x of manipulator or grippers.

Figure 9A:
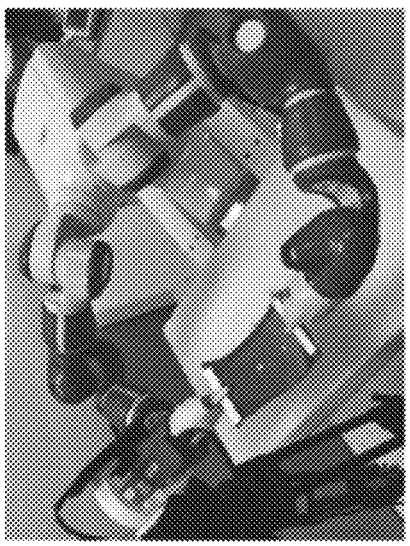
FIG. 9A is a picture showing initial state for the assembly process in Experiment 1 when the stretchable cloth piece is used.
Figure 9B:
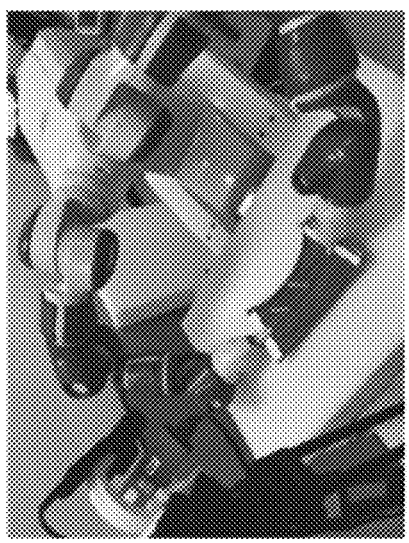
FIG. 9B is a picture showing final state for the assembly process in Experiment 1 when the stretchable cloth piece is used.
Figure 9C:
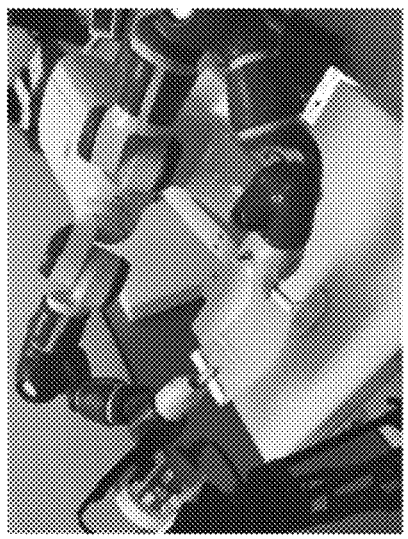
FIG. 9C is a picture showing initial state for the assembly process in Experiment 1 when the unstretchable cloth piece is used.
Figure 9D:
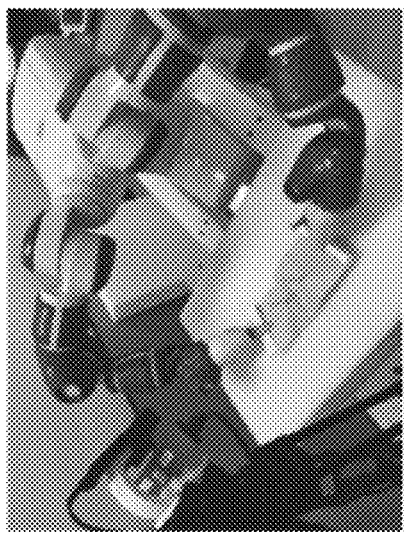
FIG. 9D is a picture showing final state for the assembly process in Experiment 1 when the unstretchable cloth piece is used.
Figure 12B:
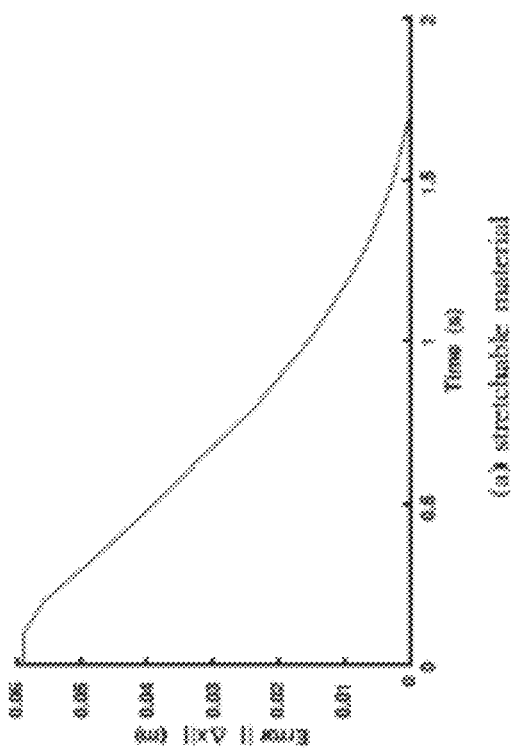
FIG. 12B is a graph showing measured errors between the current positions of holes and target positions during manipulation of the unstretchable material in Experiment 1.
Figure 12A:
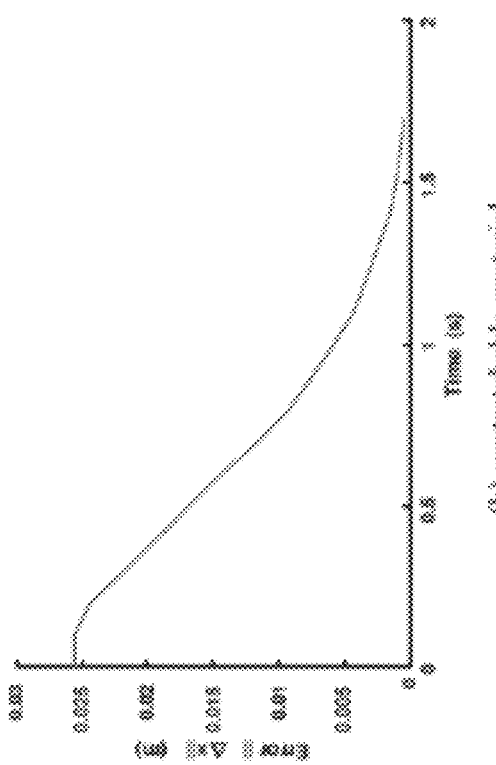
FIG. 12A is a graph showing measured errors between the current positions of holes and target positions during manipulation of the stretchable material in Experiment 1.

FIGS. 9A and 9B show the initial state and the final state for the assembly process in Experiment 1 when the stretchable cloth piece is used; while FIGS. 9C and 9D show the initial state and the final state for the assembly process in Experiment 1 when the unstretchable cloth piece is used. The curves for the measured errors between the current position of holes and target positions during manipulation in this experiment are shown in FIGS. 12A and 12B, where it can be observed that the errors drop quickly to zero for both materials. From these results, it can be concluded that the visual-servoing system in the present embodiment can handle materials with different stiffness well and can accomplish tasks properly when different manipulation skills like stretching and squeezing are required.

Figure 10C:
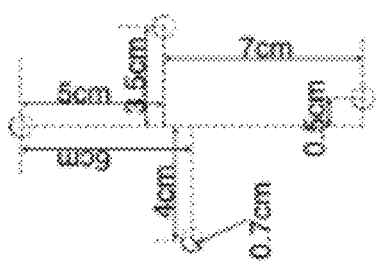
FIG. 10C is a schematic illustrating the configuration of pins on the fixture in FIG. 10A.
Figure 10B:
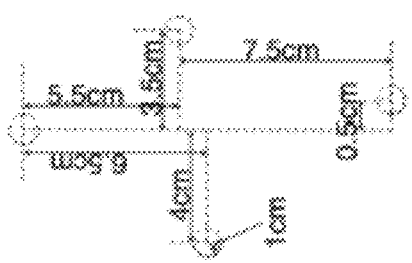
FIG. 10B is a schematic illustrating the configuration of holes in the cloth piece in FIG. 10A.
Figure 10A:
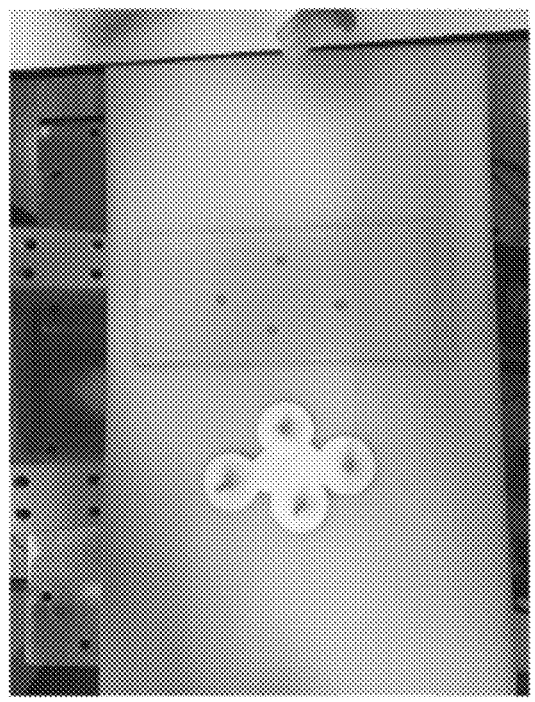
FIG. 10A is a picture showing items (from left to right: the fixture and the un-stretchable cloth piece) used in Experiment 2 performed using the system of FIG. 6.

Experiment 2 is designed to test the performance of the system of the present embodiment when it is used to handle tasks where the dimension of target position is larger than the degrees-of-freedom of the grippers (a difficulty from the control perspective). In this experiment, a cloth piece with four holes and a fixture as shown in FIG. 10A are used. The hole arrangement of the cloth piece is shown in FIG. 10B and the pin arrangement of the fixture is shown in FIG. 10C. The pin arrangement and the hole arrangement are of slightly different geometry. Since there are four holes in total, the dimension of the vector c corresponding to the positions of holes is 12 while the dimension of the vector x corresponding to the end-effector position is 6.

Figure 11B:
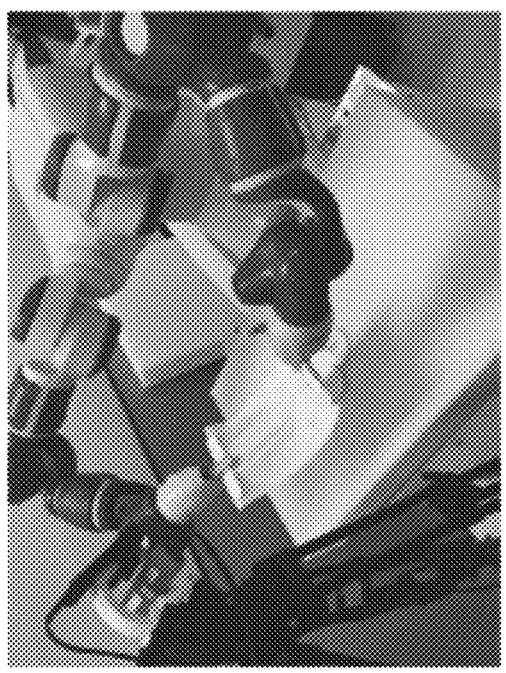
FIG. 11B is a picture showing final state for the assembly process in Experiment 2.
Figure 11A:
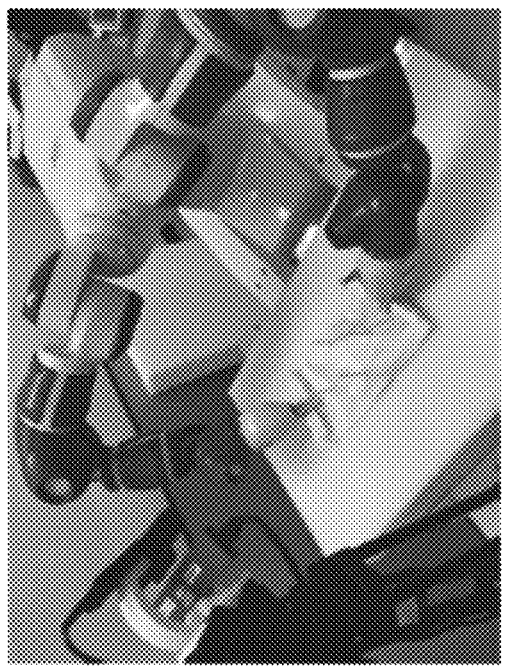
FIG. 11A is a picture showing initial state for the assembly process in Experiment 2.
Figure 13:
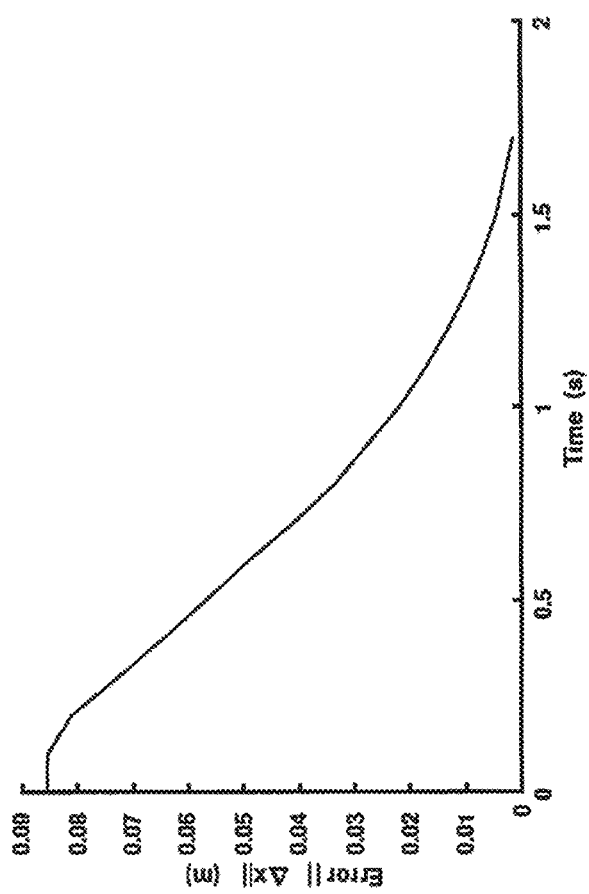
FIG. 13 is a graph showing measured errors between the current positions of holes and target positions during manipulation of the material in Experiment 2.

FIGS. 11A and 11B show the initial state and the final state for the assembly process in Experiment 2. The curve for the errors between the current positions of holes and target positions during manipulation is shown in FIG. 13. It can be observed that the error decreases to zero within acceptable time. This experiment validates the system of the present embodiment, showing that it can handle tasks in which the target requirement has higher dimensions than the degrees-of-freedom of the manipulator.

Figure 14:
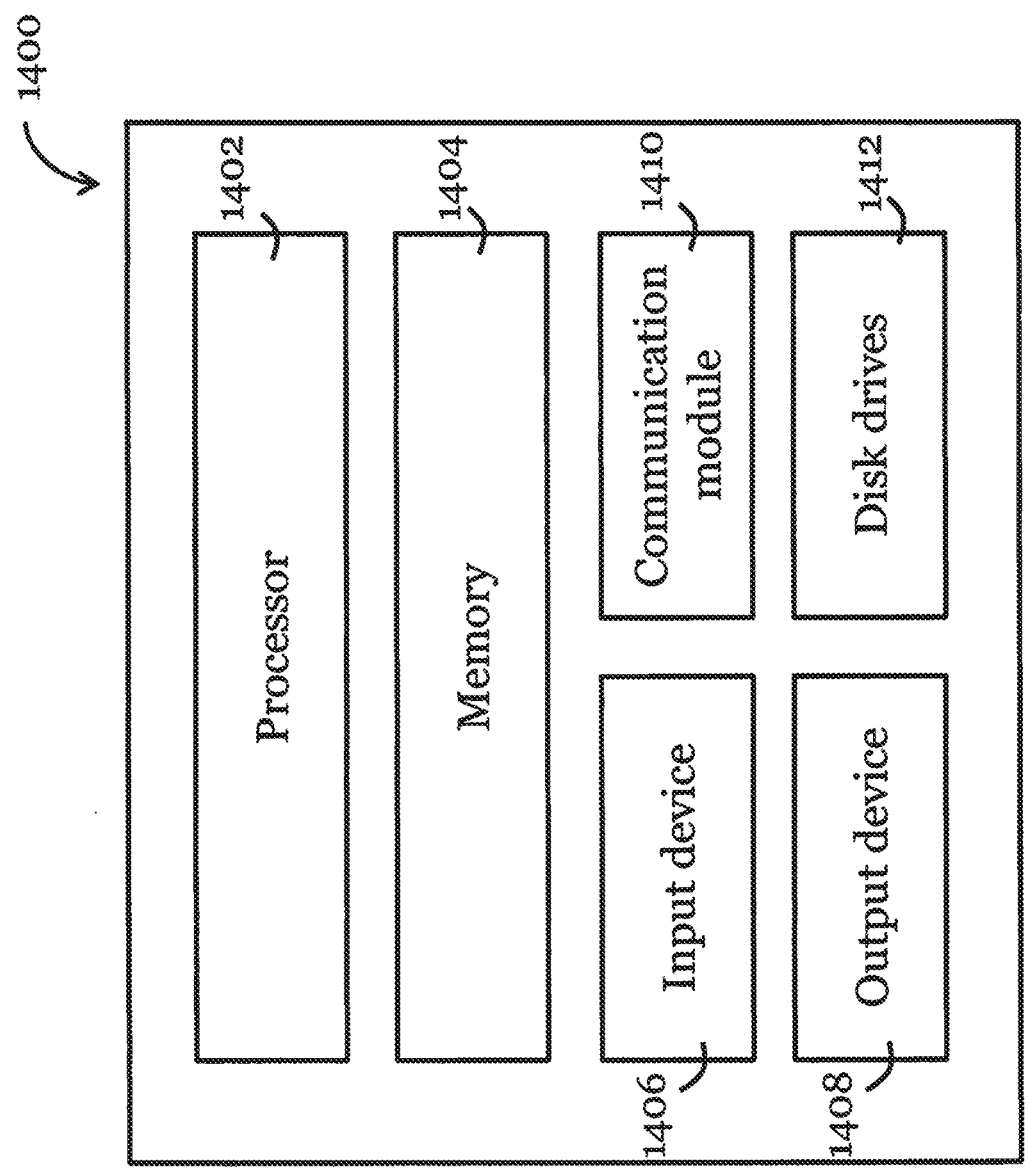
FIG. 14 is a functional block diagram of an information handling system that can be used to implement the method of FIG. 2.

Referring to FIG. 14, there is shown a schematic diagram of an exemplary information handling system 1400 that can be used to implement the method of FIG. 2 in one embodiment of the invention. Preferably, the information handling system 1400 may have different configurations, and it generally comprises suitable components necessary to receive, store and execute appropriate computer instructions or codes. The main components of the information handling system 1400 are a processing unit 1402 and a memory unit 1404. The processing unit 1402 is a processor such as a CPU, an MCU, etc. The memory unit 1404 may include a volatile memory unit (such as RAM), a non-volatile unit (such as ROM, EPROM, EEPROM and flash memory) or both. Preferably, the information handling system 1400 further includes one or more input devices 1406 such as a keyboard, a mouse, a stylus, a microphone, a tactile input device (e.g., touch sensitive screen) and a video input device (e.g., camera). The information handling system 1400 may further include one or more output devices 1408 such as one or more displays, speakers, disk drives, and printers. The displays may be a liquid crystal display, a light emitting display or any other suitable display that may or may not be touch sensitive. The information handling system 1400 may further include one or more disk drives 1412 which may encompass solid state drives, hard disk drives, optical drives and/or magnetic tape drives. A suitable operating system may be installed in the information handling system 1400, e.g., on the disk drive 1412 or in the memory unit 1404 of the information handling system 1400. The memory unit 1404 and the disk drive 1412 may be operated by the processing unit 1402. The information handling system 1400 also preferably includes a communication module 1410 for establishing one or more communication links (not shown) with one or more other computing devices such as a server, personal computers, terminals, wireless or hand-held computing devices. The communication module 1410 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 1402, the memory unit 1404, and optionally the input devices 1406, the output devices 1408, the communication module 1410 and the disk drives 1412 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the information handling system 1400 shown in FIG. 14 is merely exemplary, and that different information handling systems 1400 may have different configurations and still be applicable in the invention.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

The above embodiments of the invention provide a system for manipulating deformable objects, e.g., for assembling cloth pieces. The system can adapt to the variation in size, shape, and material of the cloth piece and is robust with respect to the pattern of holes in the cloth piece. In particular, an online learning algorithm is used to learn a controller, which has the changing speed of holes in the cloth piece as the input and the moving velocity of the end-effectors as the output. The controller will be continuously updated with the new sensor measurements in order to maintain the latest knowledge about the relation between the deformation and the movement of the end-effectors. The method of the invention requires no prior knowledge about the deformation parameters of cloth pieces and thus is applicable for general assembly tasks involving deformable objects. The above embodiments of the invention also provide a method for manipulating deformable objects. The method in the above embodiments is applicable to general fabrics by using the model-free framework. Such model can learn the object's deformation parameters online, leading to the tolerance to unknown or uncertain deformation parameters. A Gaussian Process (GP) model is used in one embodiment to better encode the nonlinearity in the deformation behaviour of the object. The system and methods in the above embodiments are applicable solution to the cloth assembly problem and can make an important component of the entire pipeline of automated garment manufacturing.

It will be appreciated by persons skilled in the art that numerous variations and/or modifications may be made to the invention as shown in the specific embodiments without departing from the spirit or scope of the invention as broadly described. For example, the system and method can be applied to manipulate different deformable objects such as cloth, paper, garments, etc. The markers on the deformable objects need not be holes, but can be, for example, identification marks. The number of markers can be freely chosen. The system and method can be equally applied to manipulate rigid objects that are substantially not deformable during manipulation. The system and method can be integrated as a robotic sewing system and method. The robotic manipulator could take any other form, with two or more robotic arms. The sensor can be any depth camera operable to provide 2D image and depth image. The controller may be implemented using one or more computing devices, CPU, MCU, logic components, etc. The present embodiments are, therefore, to be considered in all respects as illustrative and not restrictive.

The invention claimed is:

1. A method for manipulating a deformable object, comprising:
   determining respective 3D position of one or more markers on the deformable object held by a robotic manipulator;
   determining, based on online learning, a deformation model of the deformable object by mapping movement velocity of the robotic manipulator and movement velocity of one or more markers using Gaussian process regression; and
   controlling the robotic manipulator based on the determined deformation model to manipulate the deformable object so as to move the one or more markers into respective target position.

2. The method of claim 1, wherein the determination of respective 3D position of one or more markers comprises:
   detecting the one or more markers on the deformable object;
   tracking the one or more markers on the deformable object as the deformable object is manipulated by the robotic manipulator; and
   calculating respective 3D position of the one or more markers based on the detection and tracking result.

3. The method of claim 2, wherein the detection of the one or more markers comprises:
   detecting, using a sensor, respective 2D position of the one or more markers.

4. The method of claim 3, wherein the detection uses a template matching method that includes:
   comparing data obtained by the sensor with reference data for the one or more markers to determine similarity to provide a similarity result; and
   determining presence of the one or more markers based on the similarity result.

5. The method of claim 4, wherein the template matching method further includes:
   binarizing the similarity result based on a threshold to provide a binarized result, and applying a morphological operation to the binarized result to facilitate determination of the presence of the one or more markers.

6. The method of claim 2, wherein the tracking of the one or more markers comprises:
   detecting, using a sensor, respective 2D position of the one or more markers as the deformable object is manipulated.

7. The method of claim 6, wherein the tracking uses a kernelized correlation filters tracking method that includes:
   comparing data obtained by the sensor at different instances using a classifier.

8. The method of claim 7, wherein the classifier is trained using data obtained by the sensor at different instances.

9. The method of claim 1, wherein the deformation model is continuously determined as the robotic manipulator is controlled based on the determined deformation model.

10. The method of claim 1, wherein controlling the robotic manipulator to manipulate the deformable object includes:
    moving the deformable object to align the one or more markers with the respective target position; and
    moving the deformable object to bring the one or more markers to the respective target position.

11. The method of claim 10, wherein moving the deformable object to bring the one or more markers to the respective target position comprises moving the deformable object along a single direction.

12. The method of claim 3, wherein the sensor comprises one or more depth cameras.

13. The method of claim 6, wherein the sensor comprises one or more depth cameras.

14. The method of claim 12, wherein the sensor comprises an RGBD camera.

15. The method of claim 1, wherein the robotic manipulator comprises at least two robotic arms each having an end-effector for holding the deformable object.

16. The method of claim 15, wherein the end-effector includes one or more gripping plates, each gripping plate has a gripping surface with one or more nubs.

17. The method of claim 1, wherein the deformable object is a piece of fabric.

18. The method of claim 1, wherein the one or more markers are holes in the deformable object.

19. A system for manipulating a deformable object, comprising a controller arranged to:
    determine respective 3D position of one or more markers on the deformable object held by a robotic manipulator;
    determine, based on online learning, a deformation model of the deformable object by mapping movement velocity of the robotic manipulator and movement velocity of one or more markers using Gaussian process regression; and
    control the robotic manipulator based on the determined deformation model to manipulate the deformable object so as to move the one or more markers into respective target position.

20. The system of claim 19, further comprising a sensor, operably connected with the controller, for detecting and tracking the one or more markers on the deformable object.

21. The system of claim 20, wherein the sensor comprises one or more depth cameras.

22. The system of claim 20, wherein the sensor comprises an RGBD camera.

23. The system of claim 19, further comprising the robotic manipulator operably connected with the controller, wherein the robotic manipulator comprises at least two robotic arms each having an end-effector for holding the deformable object.

24. The system of claim 23, wherein the end-effector includes one or more gripping plates, each gripping plate has a gripping surface with one or more nubs.

25. The system of claim 20, wherein the controller is arranged to process data obtained by the sensor, to calculate respective 3D position of the one or more markers.

26. The system of claim 20, wherein the controller is arranged to:
    compare data obtained by the sensor with reference data for the one or more markers to determine similarity to provide a similarity result;
    binarizing the similarity result based on a threshold to provide a binarized result and applying a morphological operation to the binarized result; and
    determine presence of the one or more markers.

27. The system of claim 20, wherein the controller is arranged to:
    compare data obtained by the sensor at different instances using a classifier, wherein the classifier is trained using data obtained by the sensor at different instances.

* * * * *